United States Patent [19]

Littecke et al.

[11] Patent Number: 5,569,000
[45] Date of Patent: Oct. 29, 1996

[54] CUTTING INSERT ADJACENT CHIP BREAKERS HAVING SINTERED HARD BODIES DISPOSED IN CORNERS

[75] Inventors: Peter Littecke, Huddinge; Anders Thelin, Vällingby, both of Sweden

[73] Assignee: Sandvik AB, Sandviken, Sweden

[21] Appl. No.: 249,214

[22] Filed: May 26, 1994

[30] Foreign Application Priority Data

May 27, 1993 [SE] Sweden .................... 9301811

[51] Int. Cl.⁶ ..................... B23B 27/22; B23B 27/16
[52] U.S. Cl. .................................. 407/114; 407/119
[58] Field of Search .................... 407/114, 115, 407/116, 118, 119

[56] References Cited

U.S. PATENT DOCUMENTS

| | | | |
|---|---|---|---|
| 4,437,800 | 3/1984 | Araki et al. | 407/119 |
| 4,702,649 | 10/1987 | Komanduri | 407/119 |
| 5,183,362 | 2/1993 | Kuroyama et al. | 407/118 |

FOREIGN PATENT DOCUMENTS

| | | |
|---|---|---|
| 0425812 | 5/1991 | European Pat. Off. . |
| 1/171705 | 7/1989 | Japan . |

*Primary Examiner*—M. Rachuba
*Assistant Examiner*—Kenneth J. Hansen
*Attorney, Agent, or Firm*—Burns, Doane, Swecker & Mathis, L.L.P.

[57] ABSTRACT

A cutting insert is formed by making a body (e.g., carbide) which includes a chip face having an outer peripheral edge. The chip face includes a complex chip breaker structure, and a recess disposed between the edge and the chip breaker structure and spaced inwardly from the edge. The recess is filled with a powder of hard material (e.g., diamond or cBN) which is then transformed into a hard body under high pressure and heat conditions. The portion of the base disposed between the edge and the hard body is sufficiently thick to support the body during that pressing step. Then, some or all of that portion is ground away.

5 Claims, 3 Drawing Sheets

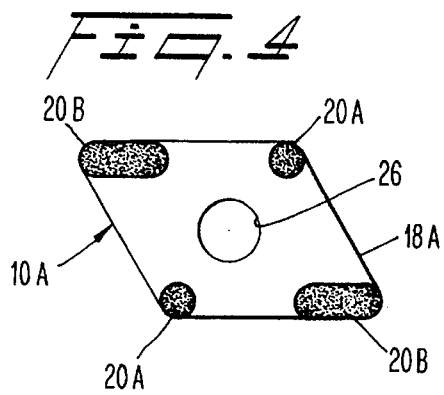
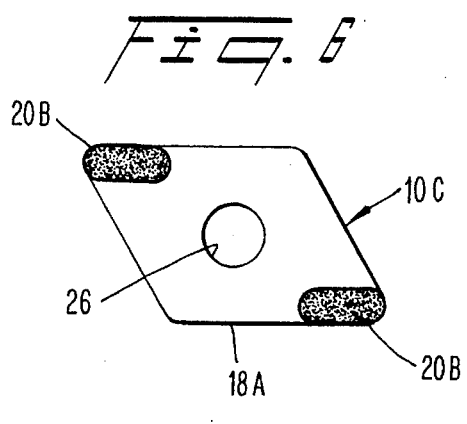
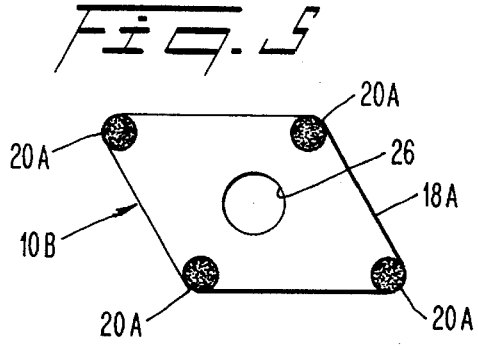
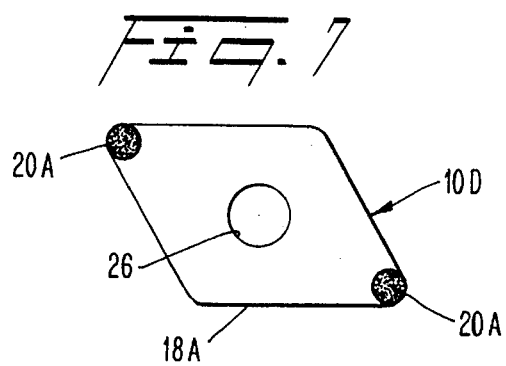
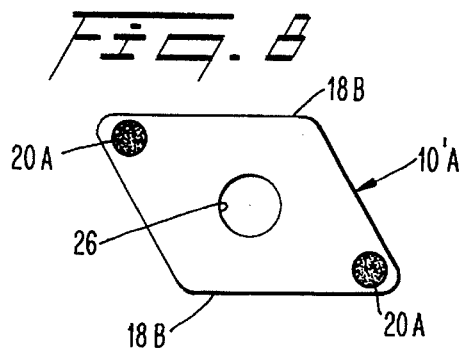
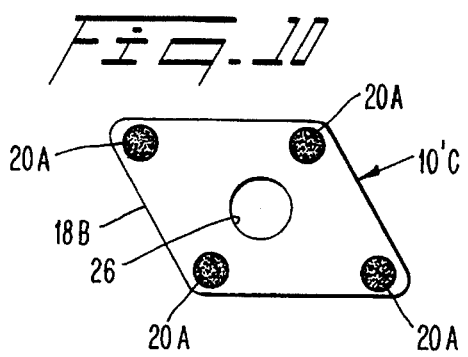
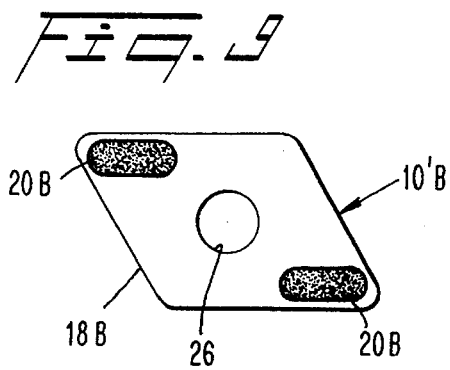
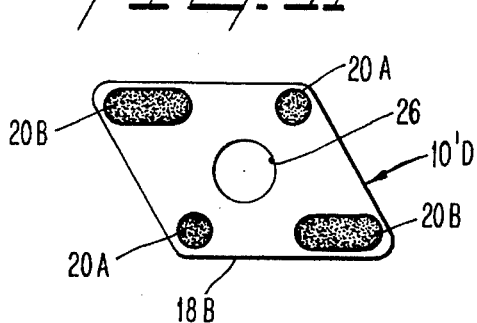

CUTTING INSERT ADJACENT CHIP BREAKERS HAVING SINTERED HARD BODIES DISPOSED IN CORNERS

BACKGROUND OF THE INVENTION

The present invention relates to a cutting insert, especially a metal cutting insert having high wear resistance and excellent chip breaking properties.

For the machining of several non-ferrous alloys like brass, magnesium and aluminum, diamond is the best tool material.

Cutting inserts formed with diamond include (i) so-called PDC (polycrystalline diamond compact) comprising a cemented carbide cylindrical base or disk B with a diamond layer A applied usually at such high temperature and pressure where diamond is in the stable phase (FIG. 1), and (ii) polygonal inserts provided with diamond bodies in a corner or along an edge generally fastened by brazing (FIGS. 2 and 3). Depicted in FIG. 2 is a triangular base D with a diamond body E in a corner thereof; depicted in FIG. 3 is a triangular base F with an elongated diamond body G extending along one edge of the base.

Another type of tool material produced at a similar process is cubic boron nitride (cBN) which is very well suited for machining hardened steel, chilled cast iron and cast iron at elevated speeds.

A common disadvantage with such inserts is the lack of chip breaking capabilities since no chip breakers, or only very simple chip breakers, can be provided.

SUMMARY OF THE INVENTION

The present invention relates to a cutting insert, as well as to a method of making a cutting insert. The method involves forming an insert base which includes a chip face having an outer peripheral edge, a chip breaker structure disposed in the chip face in spaced relationship to the edge, and a recess disposed in the chip face between the edge and the chip breaker structure in spaced relationship to the edge. The recess has side walls and a bottom wall. The recess is filled with a powder of material harder than the base. The powder is treated under high temperature, high pressure conditions to transform the powder into a hard body. At least a portion of the insert base disposed between the edge and the hard body is ground away.

The grinding may remove all or only a part of that portion of the insert base, whereby the hard body can be spaced from the edge, or can define a portion of the edge.

The chip breaking structure may be in the form of a plurality of spaced projections.

The hard body may comprise diamond or cBN, for example.

The hard body is preferably of round or elongate structure as viewed perpendicular to the chip face.

The insert may comprise one or a plurality of hard bodies.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIGS. 4–11 show various configurations of diamond/cBN bodies which can be used in accordance with the present invention;

DETAILED DESCRIPTION OF PREFERRED EMBODIMENTS OF THE INVENTION

Figure 12A:
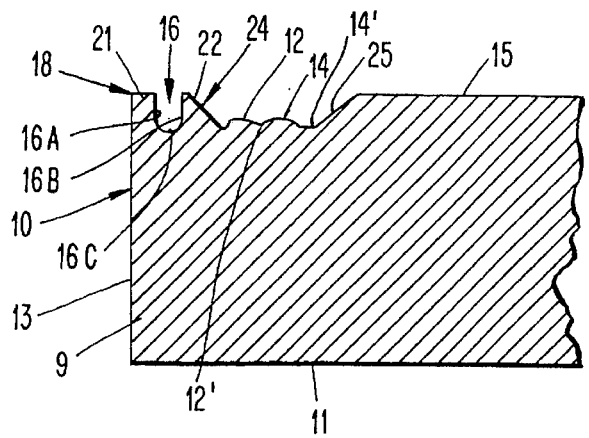
FIGS. 12A–12C illustrate steps involved in carrying out one method according to the invention.
Figure 12B:
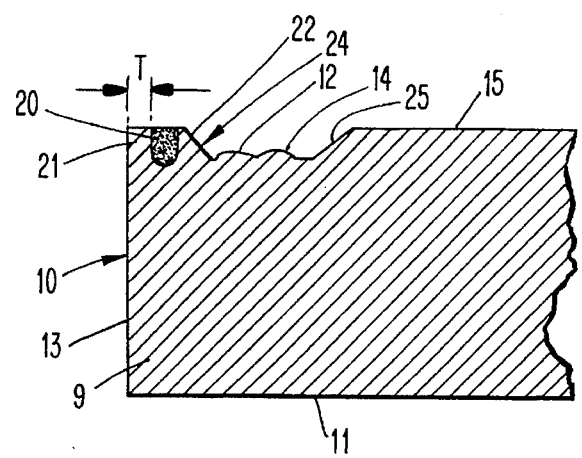
Figure 12C:
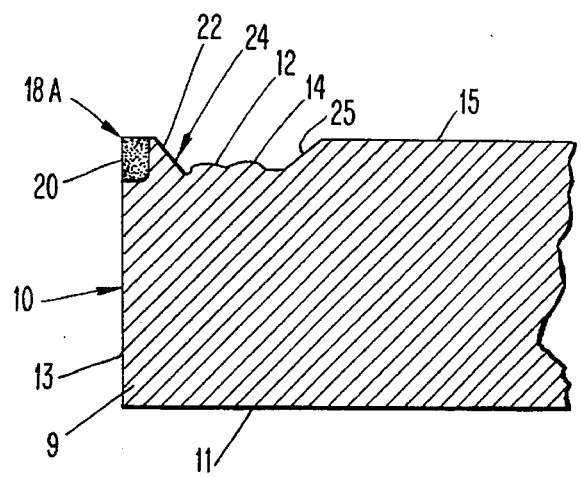

According to one method of the invention depicted in FIGS. 12A–12C a base 9 of a cutting insert 10 is formed by a conventional sintering/pressing technique. The base 9 has a bottom face 11, a side face 13 and a chip face 15 in which are provided a complex chip breaking structure 12, 14 and a recess 16. The recess 16 can be round or elongated and is spaced from an outer peripheral edge 18 of the chip surface 15 and includes outer and inner sides 16A, 16B and a bottom 16C.

The recess 16 is then filled with a powder of a hard material (e.g., diamond or cBN powder), a binder metal (e.g., cobalt and/or nickel) and sintering aids or other conventional materials which are known to the skilled artisan. The diamond/cBN material is then treated at high pressure/high temperature by a conventional technique to form a hard body 20 in the insert (see FIG. 12B). The thickness T of the portion 21 of the base located between the recess 16 and the edge 18 is sufficient to withstand the pressure.

Figure 1:
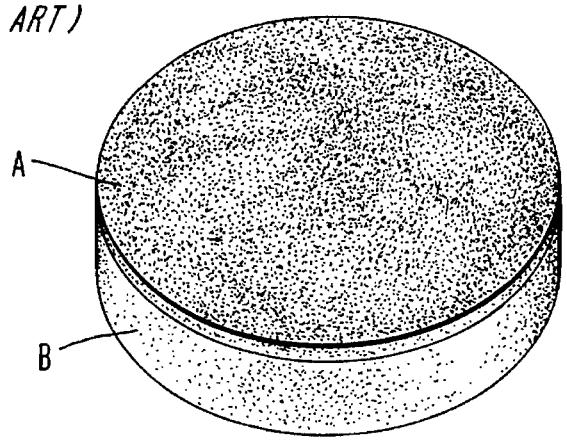
FIGS. 1–3 show inserts provided with diamond/cBN bodies according to THE prior art.
Figure 2:
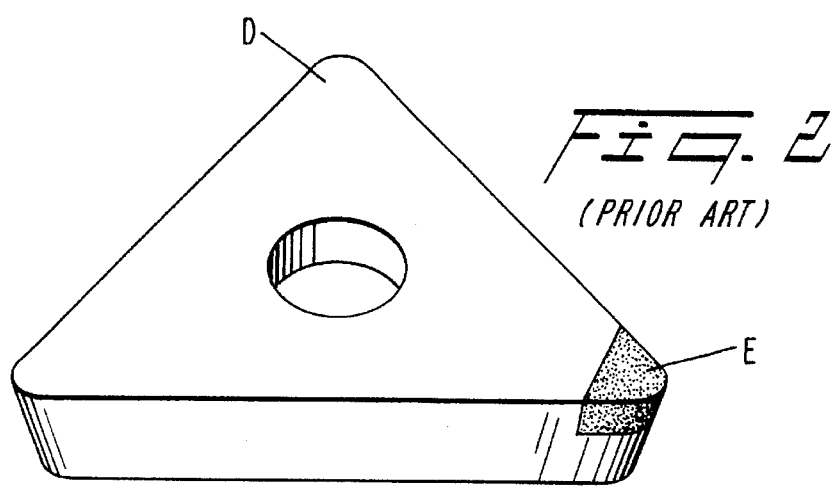
Figure 3:
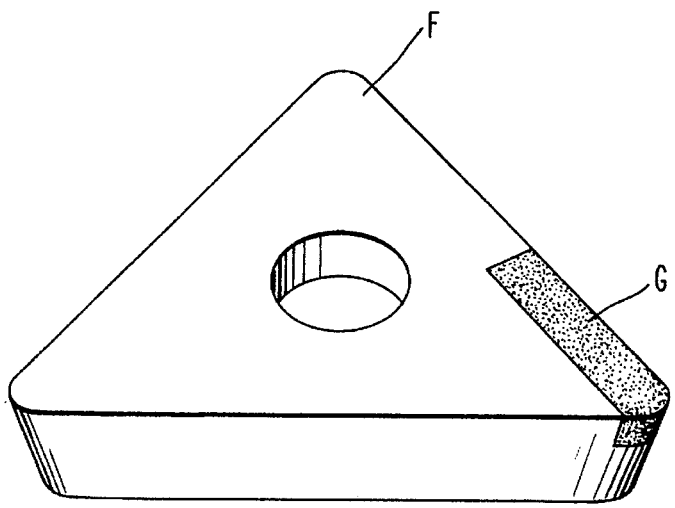

Then, the portion 21 of the insert base 9 is ground away so that the edge 18A is now defined by the diamond/cBN material (see FIG. 2C).

Figure 12D:
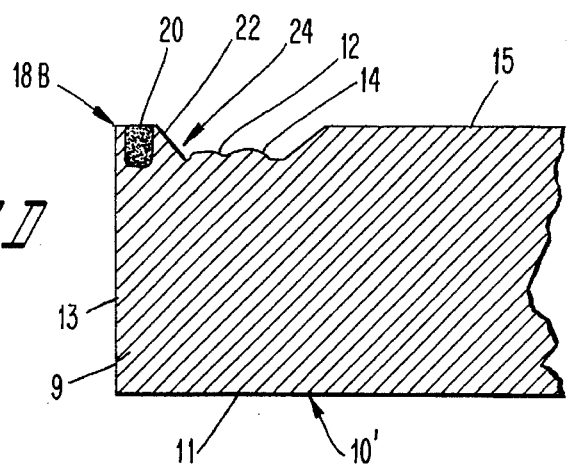
FIG. 12D illustrates a step involved in carrying out another method according to the invention.

In an alternative embodiment, the portion 21 is only partially ground away so that the cutting edge 18B is still formed by the material of the base (see the insert 10' depicted in FIG. 12D) e In either case (i.e., FIGS. 12C or 12D), a ridge 22 separates the hard body 20 from the chip groove 24.

The insert base 9 can comprise, for example, cemented carbide, titanium based carbonitride, so-called cermet or ceramics. In one embodiment the insert contains well dispersed diamond/cBN particles. In another embodiment the insert comprises a core containing etaphase or some other more or less carbon and/or nitrogen intermediate free phase surrounded by a surface zone free of said intermediate phase according to Swedish Patent 453,202. The diamond/cBN bodies can, of course, be replaced by bodies of any other material that is harder and more wear resistant than the material of the insert base.

The chip breaker structure can be of any suitable configuration. One preferred chip breaker structure comprises projections 12, 14 formed in the groove 24, the latter having a rear wall 25.

The shape of the hard body 20 can vary, and different combinations of round and elongated shapes 20A, 20B, respectively, are depicted with respect to inserts 10A–10D in FIGS. 4–7 (wherein the hard body defines the edge), and with respect to inserts 10'A–10'D in FIGS. 8–11 (wherein the insert base defines the edge).

The insert base can be provided with a center hole 26, if desired, for the reception of a fastening screw.

According to the present invention there is now provided a cutting insert having one or more hard bodies while exhibiting good chip breaking properties. A chip breaker of high degree of complexity is provided which comprises a plurality of projections and recessed areas 12, 14, 12', 14' formed during the pressing operation. The cutting edge(s) can be defined by either the hard material (FIGS. 4–7 and 12C) or the insert base (FIGS. 8–11 and 12D).

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert comprising a polygonal base including a chip face having a plurality of corners, a bottom face, and a side face disposed between the chip face and bottom face, the chip face having formed therein a chip breaker structure spaced inwardly from the side face, the chip breaker structure comprising a plurality of projections, and a plurality of hard bodies disposed within respective corners of the chip face between the side face and the chip breaker structure, each hard body comprised of a material harder than the base, the hard bodies including at least one solid cylindrical hard body of round cross section as viewed in a direction perpendicular to the chip face and at least one solid hard body elongated in a direction parallel to the side face as viewed in a direction perpendicular to the chip face; all of the hard bodies being sintered directly to the base.

2. A cutting insert according to claim 1, wherein each hard body is flush with the side face.

3. A cutting insert according to claim 1, wherein each hard body is spaced from the side face by a portion of the base.

4. A cutting insert according to claim 1, wherein each hard body comprises diamond.

5. A cutting insert according to claim 1, wherein each hard body comprises cBN.

\* \* \* \* \*